Dec. 17, 1968 W. B. LUMPKIN 3,417,014
METHOD AND APPARATUS FOR EMULSION CONTROL
Filed Oct. 4, 1966 2 Sheets-Sheet 1

INVENTOR
W. B. LUMPKIN
BY Youngs & Quiggs
ATTORNEYS

United States Patent Office 3,417,014
Patented Dec. 17, 1968

3,417,014
METHOD AND APPARATUS FOR EMULSION CONTROL
William B. Lumpkin, Caracas, Venezuela, assignor to Phillips Petroleum Company, a corporation of Delaware
Filed Oct. 4, 1966, Ser. No. 584,263
9 Claims. (Cl. 208—187)

ABSTRACT OF THE DISCLOSURE

Oil-water emulsion can be prevented by maintaining the temperature and pressure within a liquid-vapor separator at optimum levels by measuring the pressure in the liquid-vapor separator and measuring the water content of the oil phase after the liquid has separated in another vessel. A heating element in the liquid-vapor vessel is operated in response to a pressure controller and an aqueous phase detector, simultaneously, thus preventing emulsion on the basis of one of several criteria, such as pressure, BS & W concentration, temperature, gas-to-oil ratio, water-to-oil ratio, etc.

---

Figure 1:
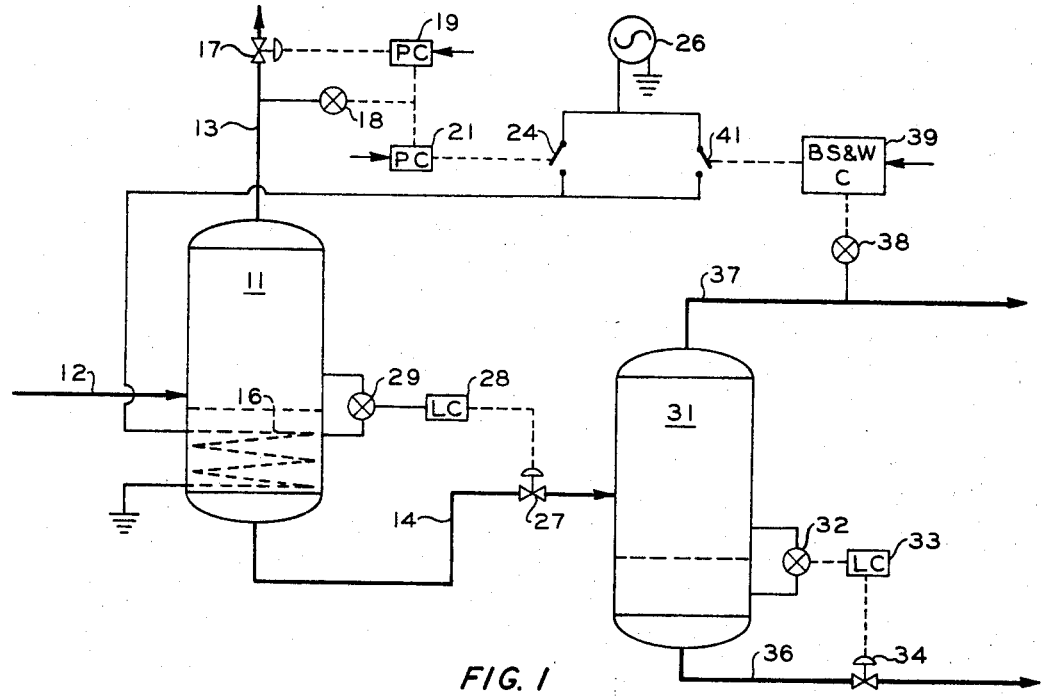

This invention relates to emulsion control. In one aspect it relates to a method of and apparatus for preventing or reducing the formation of an emulsion. In another aspect it relates to a method of and apparatus for emulsion control in oil recovery operations.

In the production of oil from wells, water is often produced with the oil and particularly in secondary recovery operations using water and/or steam, the oil-water mixture is often recovered in the form of an emulsion. Emulsions conventionally have been broken by heat and/or filtering separation tanks containing particulate matter to separate the emulsion into an equeous and an oily phase which has been separated.

The emulsion problem is considerably aggravated during in situ combustion and high temperature steam in situ cracking operations. In such an operation, as the product cools an emulsion is formed which is difficult to break. A good emulsion control system can be a determining factor in a successful operation of a high temperature oil recovery project.

An object of my invention is to control emulsion formations.

Another object of my invention is to control emulsions in oil recovery operations.

Another object of my invention is to prevent or reduce the formation of emulsions in the bottom product of a vapor-liquid separator.

Other aspects, objects and advantages of my invention will be apparent to one skilled in the art from a study of the written description, the drawing and the claims.

In accordance with the present invention, I have found that emulsions can be prevented by maintaining temperature and pressure within a liquid-vapor separator at optimum levels determined by measurements of pressure and water-oil ratios.

Further according to my invention a pressure sensing element, such as a pressure activated switch, and a water sensing element, such as a BS & W (basic sediment and water) detector, are employed to prevent the formation of an emulsion by transmitting electrical signals to a heat controlling means which in turn supplies electrical current to a heating means positioned within the liquid-vapor separator. By heating the liquid phase within said liquid-vapor separator and thus increasing the pressure in said liquid-vapor separator the formation of an emulsion is prevented.

Figure 2:
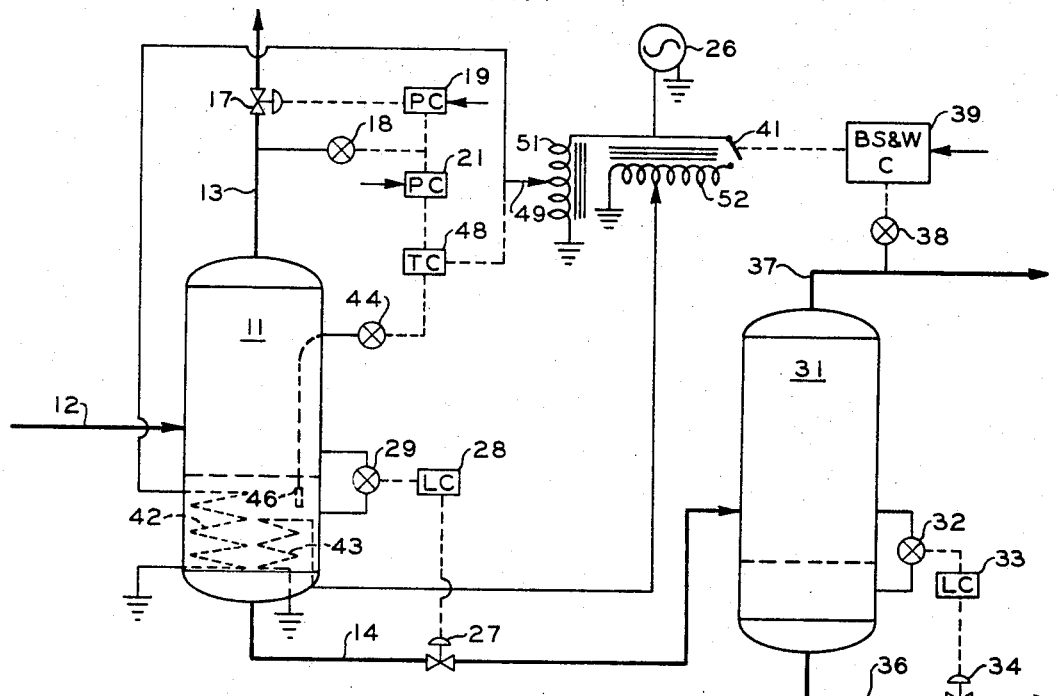
Figure 3:
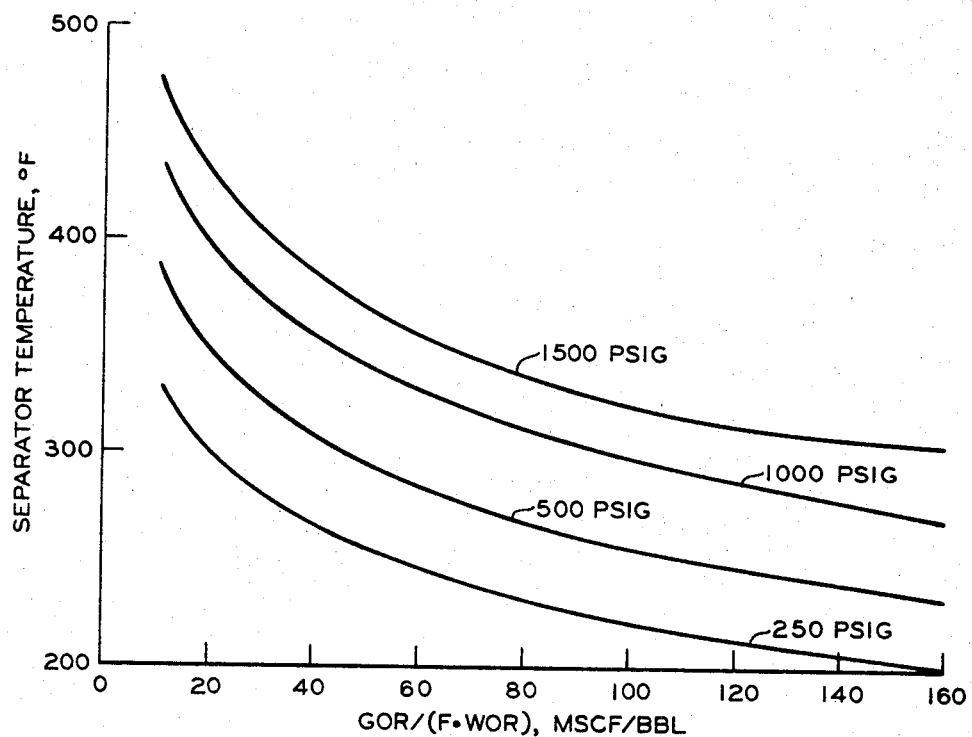

In the drawing,
FIGURE 1 is a schematic representation of an emulsion control unit having an emulsion detector means and a pressure sensing means for the prevention of the formation of an emulsion.
FIGURE 2 is another embodiment of an emulsion control unit having an emulsion detector means and pressure sensing means for the prevention of the formation of an emulsion.
FIGURE 3 is a graph representing calculated separator temperatures required to prevent the formation of an emulsion for different operating conditions of pressure, water-oil ratio (WOR), and gas-oil ratio (GOR).

Referring now to the drawing in detail where like elements are designated by like numerals, and to FIGURE 1 in particular, there is shown a system for preventing the formation of an emulsion. A feed stream, consisting of hot, recovered products from a well comprising oil, water and light hydrocarbons, enters liquid-vapor separator vessel 11 through conduit 12 which is connected to and in fluid communication with liquid-vapor separator vessel 11. Light hydrocarbons and a portion of the water as vapors are passed overhead through vapor outlet conduit 13 which is connected to and in fluid communication with the upper portion of liquid-vapor separator vessel 11, while the liquid components of the feed stream pass from liquid-vapor separator vessel 11 by means of outlet conduit 14 connected to and in fluid communication with the lower portion of liquid-vapor separator vessel 11. A heating element 16 is positioned within liquid-vapor separator vessel 11 and supplies heat to the feed stock within liquid-vapor separator vessel 11 to facilitate separation of the light hydrocarbons and a portion of the water vapor present in the feed stock and to prevent cooling of the feed stock and thereby prevent the formation of an emulsion.

A pressure control valve 17 is connected to and in fluid communication with conduit 13 to operate in responce to line pressure in conduit 13 which is representative of the operating pressure in liquid-vapor separator vessel 11. Pressure in line 13 is measured by transducer 18 which transmits a signal representative of the pressure to controllers 19 and 21. In pressure controller 19 the signal received from transducer 18 is compared with a set point value of controller 19, thereby producing an output signal which is applied to actuate valve 17 so as to maintain the pressure in liquid-vapor separator vessel 11 equal to or less than the set point value of pressure controller 19. The signal representative of pressure in liquid-vapor separator vessel 11 from transducer 18 is also applied to controller 21 wherein it is compared with a set point value of controller 21. The set point value of controller 21 is lesser in magnitude than the set point value of controller 19. Controller 21, responsive to the difference between the set point values of controller 21 and the signal from transducer 18 operates in an on-and-off fashion, electrical switch 24 which applies electrical current from power source 26 through heating element 16, thus heating the liquid phase in liquid-vapor separator vessel 11 to a temperature which provides vapor pressure therein equal to the predetermined set point value of pressure controller 21.

The combined actions of pressure controllers 19 and 21 cause the pressure within liquid-vapor separator vessel 11 to be maintained at either or between both of the values represented by set point values of pressure controllers 19 and 21. The electrical voltage applied by power source 26 may be regulated by apparatus (not shown) to a value suitable for element 16 and the rate of heating desired for a particular vessel and well fluid.

A desired depth of liquid in liquid-vapor separator vessel 11 is maintained by valve 27 operatively connected to and manipulated by controller 28 and level transmitter 29 on liquid-vapor separator vessel 11, discharging liquid from liquid-vapor separator vessel 11 to liquid-liquid separator vessel 31 by way of conduit 14.

Conduit 14 is connected to and in fluid communication with liquid-liquid separator vessel 31, thereby allowing liquid products flowing from liquid-vapor separator vessel 11 to enter liquid-liquid separator vessel 31 by means of conduit 14. Liquid-liquid separator vessel 31 is provided with outlet conduits 36 and 37, connected to and in fluid communication with liquid-liquid separator vessel 31. A liquid-liquid interfacial level control 33 operates valve 34 connected to and in fluid communication with conduit 36 for removing water from liquid-liquid separator vessel 31. Level controller 33 operates in response to the signal received from level transmitter 32 for maintaining the interfacial level between the water and oil phases in liquid-liquid separator vessel 31.

Outlet conduit 37 is connected to and in fluid communication with the upper portion of liquid-liquid separator vessel 31 for removing separated oil from said vessel. The oil in liquid-liquid separator vessel 31 is removed through conduit 37 which communicates with a storage tank (not shown).

Conduit 37 has a BS & W monitor 38 operatively connected thereto. The concentration of BS & W present in the crude oil is determined by measuring the dielectric constant of the oil. The resulting capacity is measured, thereby transmitting an electrical signal which is representative of the BS & W content of the oil to BS & W on-off controller 39. As long as the BS & W content of the oil is lower than a predetermined value, switch 41 remains in an open position thereby creating an open circuit from power source 26 via switch 41 to heater 16 disposed within liquid-vapor separator vessel 11. If the BS & W content of the oil should become greater than set point value of BS & W controller 39, BS & W controller 39 causes switch 41 to close, thus completing the circuit between power source 26 and heating element 16 within liquid-vapor separator vessel 11 thereby allowing current to flow through heating element 16 from power source 26. The feed stock within liquid-vapor separator vessel 11 is then heated until the signal representative of the concentration of BS & W in the oil flowing through conduit 37 is determined to be equal to or below the set point value of BS & W controller 39. When the measured BS & W content of the oil in conduit 37 falls below the predetermined value of BS & W controller 39, it is no longer necessary to heat the feed stock within liquid-vapor separator vessel 11. At this time, BS & W on-off controller 39 withdraws the electrical signal which actuates switch 41, thereby causing an open circuit from power source 26 to heating element 16 positioned within liquid-vapor separator vessel 11. No further current flows from power source 26 through switch 41 to heating element 16 within liquid-vapor separator vessel 11 as long as the measured BS & W content within conduit 37 does not exceed the set point value applied to BS & W controller 39.

Therefore, heating element 16 is operated to satisfy the criteria of BS & W content in the oil and the pressure in liquid-vapor separator vessel 11 in response to pressure controller 21 and BS & W controller 39 resulting in heating element 16 supplying heat to the feed stock in liquid-vapor separator vessel 11 in response to set point values of pressure controller 21 and BS & W controller 39, or both operating in unison.

Referring now to FIGURE 2, there is illustrated another embodiment of the present invention. In FIGURE 2 a feed stream, consisting of hot, recovered products from a well comprising oil, water and light hydrocarbons, enters liquid-vapor separator vessel 11 through conduit 12 which is connected to and in fluid communication with a liquid-vapor separator vessel 11. Light hydrocarbons and a portion of the water as vapors are passed overhead through vapor outlet conduit 13 which is connected to and in fluid communication with the upper portion of liquid-vapor separator vessel 11, while the liquid components of the feed stream pass from liquid-vapor separator vessel 11 by means of outlet conduit 14 connected to and in fluid communication with the lower portion of liquid-vapor separator vessel 11. Heating elements 42 and 43 are positioned within liquid-vapor separator vessel 11 and supply heat to the feed stock within liquor-vapor separator vessel 11 to facilitate separation of the light hydrocarbons and a portion of the water present in the feed stock and to prevent cooling of the feed stock and thereby prevent the formation of an emulsion.

Pressure control valve 17 is connected to and in fluid communication with conduit 13 to operate in response to line pressure in conduit 13 which is representative of the operating pressure in liquid-vapor separator vessel 11. Pressure in conduit 13 is measured by transducer 18 which transmits a signal representative of the pressure to pressure controllers 19 and 21. In pressure controller 19 the signal received from transducer 18 is compared with a set point value, thereby producing an output signal which is applied to actuate valve 17 so as to maintain the pressure in liquid-vapor separator vessel 11 equal to or less than the set point value for pressure controller 19. The signal representative of pressure in liquid-vapor separator vessel 11 from transducer 18 is also applied to pressure controller 21 where it is compared with a set point value for pressure controller 21. The set point value of pressure controller 21 is lesser in magnitude than the set point value of pressure controller 19. Pressure controller 21, responsive to the difference between the set point values of pressure controller 21 and the signal from transducer 18, produces a control signal which is employed as the set point in a cascade control manner to temperature controller 48 which adjusts electrical voltage selector means 49 of transformer 51, shown here as a variable tap auto transformer. A temperature transmitter 44 is connected with a temperature sensing element 46 positioned within liquid-vapor separator vessel 11 and transmits a signal which is a function of the temperature in liquid-vapor separator vessel 11 to temperature controller 48 which is actuated by an external control signal, as, for example, having a pneumatic set point adjustment. Upon temperature controller 48 receiving a new set point signal from pressure controller 21 that a higher temperature is needed within liquid-vapor separator vessel 11 to maintain the desired pressure within said vessel, temperature controller 48 operates in a continuous fashion auto transformer 51 thereby causing a selected electrical voltage from power source 26 to be impressed across heating element 42 positioned within the liquid phase of liquid-vapor separator vessel 11 to produce, by electrical current flow, the desired heat input to bring the pressure to the predetermined set point within vessel 11 by means of the pressure-temperature-composition relationships of the liquid phase material in separator vessel 11. A desired depth of liquid in liquid-vapor separator vessel 11 is maintained by valve 27 operatively connected to and manipulated by controller 28 and level transmitter 29 on liquid-vapor separator vessel 11, discharging liquid from liquid-vapor separator vessel 11 to liquid-liquid separator vessel 31 by way of conduit 14.

Conduit 14 is connected to and in fluid communication with liquid-liquid separator vessel 31, thereby allowing liquid products flowing from liquid-vapor separator 11 to enter liquid-liquid separator vessel 31 by means of conduit 14. Liquid-liquid separator vessel 31 is provided with outlet conduits 36 and 37, connected to and in fluid communication with liquid-liquid separator vessel 31. A liquid-liquid interfaced level control 33 operates valve 34 connected to and in fluid communication with conduit 36 for removing water from liquid-liquid separator vessel 31. Level controller 33 operates in response to the signal received from level transmitter 32 for maintaining the interfacial level between the water and oil phase in liquid-liquid separator vessel 31 at a desired level.

Outlet conduit 37 is connected to and in fluid communication with the upper portion of liquid-liquid separator vessel 31 for removing separated oil from said vessel. The oil in liquid-liquid separator vessel 31 is removed through conduit 37 which communicates with the storage tank (not shown). Conduit 37 has a BS & W monitor 38 operatively connected thereto. The concentration of BS & W present in the crude oil is determined by measuring the dielectric constant of the oil. The resulting capacity is measured, thereby transmitting an electrical signal which is representative of the BS & W content of the oil to on-off BS & W controller 39. As long as the BS & W content of the oil is lower than a predetermined set point value, switch 41 remains in an open position, thereby creating an open circuit from power source 26 to heater 43 disposed within liquid-vapor separator vessel 11. If the BS & W content of the oil should become excessive, an electrical signal transmitted from BS & W detector 38 to BS & W controller 39 causes switch 41 to close, thus completing a circuit and allowing current to flow from power source 26 through auto transformer 52 to heater 43 disposed within liquid-vapor separator vessel 11. Auto transformer 52 is manually adjusted from time to time to apply a desired voltage to heating element 43 when demanded by controller 39. The feed stock within liquid-vapor separator vessel 11 is then heated until the signal representative of the BS & W content in the oil flowing through conduit 37 is determined to be below the set point value of BS & W controller 39. When the measured BS & W content of the oil in conduit 37 falls below the predetermined value of the BS & W controller 39, it is no longer necessary to heat the feed stock within liquid-vapor separator vessel 11 by means of heater 43. At this time, BS & W controller 39 withdraws the electrical signal thus opening switch 41 and thereby causing an open circuit from power source 26 through switch 41 to heating element 43 positioned within liquid-vapor separator vessel 11. No further current flows from power source 26 through switch 41 to heating element 43 within liquid-vapor separator vessel 11 as long as the measured BS & W content within conduit 37 does not exceed the set point value applied to BS & W controller 39.

Although the above embodiment has been described wherein the heaters positioned within liquid-vapor separator vessel 11 are operated singularly, it is apparent that both heaters can be operating in response to pressure controller 21, and BS & W controller 39 simultaneously, thereby preventing the formation of an emulsion in liquid-vapor separator vessel 11 on the basis of one or several criteria such as pressure, BS & W concentration, temperature, gas-to-oil ratio, water-to-oil ratio, etc.

In order to determine the operating conditions of a liquid-vapor separator vessel which will prevent the formation of emulsions in the production of counterflow combustion products under conditions of temperature and pressure near those anticipated in the Morichal Field, in Venezuela, a series of tests, employing counterflow combustion products, were performed in the laboratory. These tests were conducted by Laboratory combustion experiments using Morichal Group II oil mixed with Ottawa sand. The products were processed in a temperature-controlled liquid-vapor separator. The amount and nature of emulsions were determined at separator temperatures of 280, 300, 370 and 430° F. at a pressure of approximately 960 p.s.i.g., and at 300° F. with a pressure of 502 p.s.i.g.

A temperature-control liquid-vapor separator was installed immediately downstream of the combustion tube so that the combustion-produced fluids entered the separator as feed.

The liquid-vapor separator used in this study was a 500 cc. stainless steel vessel having an inside diameter of 2.2 inches and an inside length of 10 inches. The feed was introduced into the separator by means of a dip tube extending into the center of the vessel. The feed line, extending from the combustion tube to the separator, and the separator were wrapped with heating tape and insulated. Thermocouples, placed in the feed line and in the separator, were connected to a temperature recorder for a continuous record of the separator temperature.

All tests were made using a laboratory prepared mixture of Group II Morichal oil and bond grade Ottawa sand having no initial water saturation. The Morichal oil used in these tests had a gravity of 8.6° API, a molecular weight of 551 and a viscosity, at about 100° F., of approximately 80,000 centipoises.

The combustion tube was packed to a predetermined density with the prepared oil-sand mixture. A counterflow combustion front was initiated and propagated through the pack with pressure and air injection rate maintained essentially constant. Air injection rate to the combustion tube was the same for all tests (250 s.c.f./hour-ft.$^2$). The combustion-produced fluids were fed directly to the vapor-liquid separator.

During initial operations, while the separator was operating under transient conditions of temperature and pressure, the separator products were combined and collected as one product.

When steady state conditions were attained, and separator temperature was at the desired level, the separator overhead was condensed separately from the bottoms product. Non-condensable gases produced in the separator overhead were metered, continuously analyzed for carbon dioxide and oxygen, and then vented. Samples of the vented gases were collected periodically for analysis.

Separator temperatures were controlled to ±15° F. during each run. Separator pressure was maintained at the combustion tube pressure with a variation of ±10 p.s.i.

In each test a considerable amount of produced fluid was collected under conditions which simulated the absence of the liquid-vapor separator. These products always included a heavy water-in-oil emulsion along with varying amounts of clear oil and water.

The composition of the produced fluids, given in Table I, shows that the emulsion accounted for 20 to 80 percent of the produced liquid volume. The oil content of the emulsion is given in Table II. The results show that up to 34 percent of the total produced oil was tied up in emulsions.

When the separator was in operation the quantity of emulsion contained in the separator overhead product was significant in only one test (No. 6) in which separator temperature was 430° F. (see Table II). This emulsion was apparently formed because the heavy tar-like material which stabilizes the emulsion was either vaporized or carried overhead by liquid entrainment. In all other runs only a small amount of suspended material was contained in the separator overhead, probably carried over by entrainment.

TABLE I.—CHARACTERISTICS OF LIQUID PRODUCTS FROM COUNTERFLOW COMBUSTION OF MORICHAL OIL

| | Liquid Products [1] | | | | | | | | | | |
|---|---|---|---|---|---|---|---|---|---|---|---|
| Run No. | Separation Prevented [3] | | | Separator Conditions | | Overhead Product | | | Bottom Product | | |
| | Emulsion, Volume Percent | Oil, Volume Percent | Water, Volume Percent | Temperature, °F. | Pressure, p.s.i.g. | Emulsion, Volume Percent | Oil, Volume Percent | Water, Volume Percent | Emulsion, Volume Percent | Oil, Volume Percent | Water, Volume Percent |
| 1 | 20 | 44 | 36 | 280 | 955 | 0 | 37 | 63 | 57 | 43 | 0 |
| 2 | | | | 300 | 953 | 0 | 44 | 56 | 67 | 33 | 0 |
| 3 | 78 | 11 | 11 | 430 | 971 | 71 | 29 | Trace | 0 | 100 | 0 |
| 4 | 77 | 23 | 0 | 370 | 961 | 0 | 34 | 66 | 0 | 100 | 0 |
| 5 | [2] 80 | 15 | 5 | 300 | 502 | 0 | 27 | 73 | 0 | 100 | 0 |

[1] After standing for 72 hours at room temperature.
[2] After standing for 36 hours at room temperature.
[3] Combined separator products collected before steady state conditions were reached in separator.

TABLE II.—OIL CONTENT OF EMULSIONS

| | Oil in Emulsion [1] | | | | | |
|---|---|---|---|---|---|---|
| Run | Separation Prevented | | Overhead Product | | Bottom Product | |
| | Percent of Emulsion Volume | Percent of Total Oil Volume [2] | Percent of Emulsion Volume | Percent of Total Oil Volume [2] | Percent of Emulsion Volume | Percent of Total Oil Volume [2] |
| 1 | 29 | 6 | | | 17 | 15 |
| 2 | | | | | 30 | 29 |
| 3 | 43 | 34 | 12 | 13.4 | | |
| 4 | 36 | 27 | | | | |
| 5 | 42 | 34 | | | | |

[1] Remainder of emulsion was water.
[2] Total oil is sum of overhead and bottom oil volumes.

The separator bottom products contained an emulsion when water was present in the bottom product. This occurred only in Runs 1 and 2 (see Table II). In the other runs no water, and thus no emulsion, was contained in the separator bottom product.

The optimum operating conditions for minimizing the amount of emulsion produced appeared to be that temperature and pressure at which all of the water is produced in the separator overhead.

The effect of separator temperature on the distribution of oil between the separator overhead and the bottoms product and on the oil gravity and viscosity are given in Table III. The fraction of total separated oil which is produced in the separator overhead increased linearly with temperature. The separation obtained at 500 p.s.i. showed that for a given temperature, decreasing separator pressures will permit a substantial increase in the fraction of oil going overhead. It was also determined that oil gravity, in degrees API, decreased with increasing separator temperature for both the overhead and bottoms product.

TABLE IV.—CHARACTERISTICS OF ORIGINAL OIL AND COMBUSTION PRODUCTS

| | | Average Produced Oil | | |
|---|---|---|---|---|
| | Original Oil | Separator | | Total Oil |
| | | Overhead* | Bottoms* | |
| Carbon, wt. percent | 83.4 | 84.2 | 84.9 | 83.5 |
| Hydrogen, wt. percent | 10.6 | 12.1 | 10.6 | 11.0 |
| Oxygen, wt. percent | 1.4 | 1.6 | 1.7 | 2.1 |
| Nitrogen, wt. percent | 0.26 | 0.05 | 0.17 | 0.15 |
| Sulfur, wt. percent | 4.12 | 1.8 | 3.0 | 2.8 |
| Gravity, °API | 8.6 | 39.7 | 18.3 | 25.0 |
| Viscosity at 100° F., cp | [a]80,000 | 0.73 | 6.95 | 2.5 |
| Molecular weight | 551 | 127 | 241 | 240 |
| Initial boiling point, °F | | 100 | 135 | |

*Composed of 40% Run 51, 40% Run 52, and 20% Run 54.
[a] Estimated.

It should be noted that these tests were from tests made at a single value of air flux (250 s.c.f./hr.-ft.[2]) and using an oil-sand mixture which contained no connate water.

TABLE III.—SEPARATOR PERFORMANCE

| | Separator Conditions | | Overhead | | | | | Bottoms | | | Water-Oil Ratio | | | Gas-Oil Ratio,[d] s.c.f./bbl. |
|---|---|---|---|---|---|---|---|---|---|---|---|---|---|---|
| | | | Oil | | | Water | | Oil | | | | | | |
| Run | Temperature, °F. | Pressure, p.s.i.g. | Volume percent of Total Oil | Gravity, °API | Viscosity, cp. at 100° F. | Volume percent of Total Water | pH | Gravity, °API | Viscosity, cp. at 100° F. | Water, pH | Overhead | Bottoms | Total | |
| 1 | 280 | 955 | 19.1 | 45.6 | 0.67 | 31 | 3.8 | 18.7 | 6.9 | 2.5 | 1.7 | 0.90 | 1.03 | 33,700 |
| 2 | [a]300 | 953 | 24.2 | 45.5 | 0.65 | 27 | 3.8 | 19.4 | | 2.6 | 1.7 | 0.88 | 1.02 | 32,100 |
| 3 | 430 | 971 | 59.3 | 27.1 | 1.06 | 100 | | [b]0.4 | 200 | | 1.64 | | 1.26 | 34,700 |
| 4 | 370 | 961 | 43.3 | 41.1 | 0.69 | 100 | 3.7 | 12.3 | 9.9 | | 1.93 | | 0.98 | 34,500 |
| 5 | 300 | 502 | 47.3 | 38.5 | 0.74 | 100 | [c]3.9 | 9.9 | 16.3 | | 2.71 | | 1.05 | 42,000 |

[a] Estimated.  [b] Contained a heavy tar-like material.  [c] Resistivity=219 ohm-cm.  [d] Total produced gas/total produced oil.

The viscosities of the oil increased with temperature. The oil from the bottoms product showed a large increase in viscosity as separator temperature was increased above 380° F. However, the oil obtained from the separator bottoms at 430° F. contained the heavy tar-like material which contributed to the high viscosity and low API gravity.

Table IV gives composition and pertainent physical properties of (1) the original Morichal Group II oil, (2) a typical unsaturated produced oil, (3) an average separator overhead oil, and (4) an average separator bottoms oil product. Table V presents Hempel distillation results for the average separator overhead and bottoms product oils described in Table IV.

These conditions resulted in a product having a narrow range of gas-oil ratio (GOR) and water-oil ratio ($\phi$ WOR). The effect of a change in the gas-oil ratio or the presence of connate water in the Morichal reservoir must be considered in the application of these results to such a field.

The distribution of water in the separator products is given in Table III. Water was produced in the separator bottoms only in Runs 1 and 2. In the other runs, all water was produced in the overhead product.

The fraction of total water produced in the separator overhead for Runs 1 and 2 indicates that the overhead stream was either near 100 percent saturation with water vapor or some liquid entrainment was occurring. Calculations, based on the assumption that the overhead water vapor was saturated with water vapor and that the presence of condensable oil in the vapor stream exerted a negligible effect, predicted that a sparator temperature of 292° F. for Run 1 and 285° F. for Run 2 would produce the distribution of water actually obtained. These compare favorably with the actual temperatures of 280 and 300° F., respectively. Similar calculations correctly predicted that the separator bottoms of Runs 3 and 4 would contain no water. Under the conditions of Run 5, calculations indicate that a separator temperature of 304° F. should have been required to produce all the water in the overhead stream. This compares closely with the experimental temperature of 300° F. for this run.

The procedure followed in these calculations and a sample calculation are as follows:

ratio of the feed and the mole fraction of water vapor in the overhead stream may be calculated by:

$$GWR = 0.00847 \times \frac{GOR}{(WOR)F} \times \frac{1}{P_w}$$

$$Y_w = 1.0/(1.0 + GWR)$$

where:
GWR = gas-water ratio in overhead, lb. mole gas/lb. mole water
GOR = gas-oil ratio in feed, s.c.f./bbl. (measured at separate conditions)
WOR = water-oil ratio in feed, vol. water/vol. oil (measured at separate conditions)
F = fraction of total water in feed produced in the separator overhead, dimensionless

TABLE V.—DISTILLATION RESULTS FOR AVERAGE SEPARATOR OILS

| Temperature, °F. | Hempel Distillation | | | | | | | |
|---|---|---|---|---|---|---|---|---|
| | Separator Overhead | | | | Separator Bottoms | | | |
| | Vol. Percent Over | Cum. Percent Over | Gravity, °API | BMCI [1] | Vol. Percent Over | Cum. Percent Over | Gravity, °API | BMCI [1] |
| DISTILLATION AT 1 ATM. | | | | | | | | |
| To 122 | 2.7 | 2.7 | 80.5 | | 0.6 | 0.6 | 57.8 | 49 |
| 122–167 | 6.5 | 9.2 | 69.3 | 24 | 1.1 | 1.7 | 49.0 | 56 |
| 167–212 | 8.4 | 17.6 | 60.9 | 29 | 0.7 | 2.4 | 46.0 | 49 |
| 212–257 | 15.2 | 32.8 | 54.6 | 31 | 4.9 | 7.3 | 40.3 | 59 |
| 257–302 | 15.3 | 48.1 | 48.7 | 36 | 3.5 | 10.8 | 38.4 | 52 |
| 302–347 | 15.2 | 63.3 | 42.7 | 41 | 3.9 | 14.7 | 35.8 | 51 |
| 347–392 | 11.3 | 74.6 | 36.6 | 50 | 6.1 | 20.8 | 31.4 | 57 |
| 392–437 | 9.0 | 83.6 | 31.3 | 57 | 7.9 | 28.7 | 28.0 | 60 |
| 437–482 | 7.0 | 90.6 | 26.0 | 66 | 10.2 | 38.9 | 25.1 | 63 |
| 482–527 | 5.7 | 96.3 | 20.5 | 72 | | | | |
| VACUUM DISTILLATION AT 40 MM. | | | | | | | | |
| To 392 | | | | | 9.1 | 48.0 | 21.6 | 69 |
| 392–437 | | | | | 9.4 | 57.4 | 19.8 | 70 |
| 437–482 | | | | | 10.7 | 68.1 | 15.7 | 79 |
| 482–527 | | | | | 10.0 | 78.1 | 14.0 | 81 |
| 527–572 | | | | | 9.6 | 87.7 | 10.3 | 91 |

DISTILLATION SUMMARY

| Product | Percent | °API | Sulfur, Weight Percent | Viscosity [2] | Percent | °API | Sulfur, Weight Percent | Viscosity [2] |
|---|---|---|---|---|---|---|---|---|
| Gasoline | 74.6 | 47.0 | 1.04 | | 14.7 | 40.1 | 1.04 | |
| Kerosine | 21.7 | 26.6 | 2.39 | 1.81 | 24.2 | 27.6 | 2.12 | 29.4 |
| Gas Oil | | | | | 48.8 | 18.1 | 3.9 | 76.7 |
| Still Residue | 3.7 | | 4.0 | | 12.3 | −2.9 | 4.0 | |

[1] Bureau of Mines Correlation Index.
[2] Centipoise at 100° F.

Comparing the experimental with the calculated separator temperatures of FIGURE 3 required for the respective distribution of water in Runs 1, 2, 3, 4 and 5, it is seen that the separator temperatures required to eliminate emulsion formation for different operating conditions of pressure, water-oil ratio, and gas-oil ratio can be determined.

Calculated separator temperatures provide a convenient means for examining the effect of operating conditions and feed composition on the distribution of water in the separator products. FIGURE 3 shows calculated separator temperatures required for a specified distribution of water in the separator products at various pressures as a function of the gas-oil ratio (GOR) and water-oil ratio (WOR) of the feed, and of the fraction F of total produced water found in the separator overhead stream.

The separator temperatures shown in FIGURE 3 were calculated based on the assumption that:
(1) The separator overhead vapor stream was saturated with water vapor, and
(2) The partial pressure of other condensable materials in the overhead vapor stream was negligible.

After assuming a separator temperature, the gas-water $P_w$ = density of water at the assumed separator temperature, lbs./cubic foot
0.00847 = units conversion factor
$Y_w$ = mole fraction of water vapor in overhead vapor stream.

The partial pressure of water vapor is calculated by:

$$P_w = Y_w P$$

where:
$P_w$ = partial pressure of water vapor in separator overhead streams, p.s.i.a.
P = separator pressure, p.s.i.a.

The temperature of saturated steam at the partial pressure of water vapor in the overhead stream is noted from the steam tables. If this temperature is the same as the assumed temperature, the assumption was correct; if not, the procedure is repeated.

SAMPLE CALCULATION

ADDITIONS

GOR = 30,300 FCF flash barrel
WOR = 1.0
F = 1.0
P = 1014.7 p.s.i.a.

Assume a separator temperature of 372° F.:

$$P_w = 55.5 \text{ lb./ft.}^3$$

$$GWR = (0.00847)\frac{30,000}{(1)(1)} \times \frac{1}{55.5} = 4.58 \text{ lb. mole gas/lb.}$$

mol water $$Y_w = 1.0/(1.0+4.58) = 0.179$$
$$P_w = (0.179)(1014.7 \text{ p.s.i.a.}) = 18p \text{ p.s.i.a.}$$

From the steam tables, T sat. steam at 182 p.s.i.a. equals 374° F.

Therefore, as shown in the above tests, emulsions were eliminated by processing the produced fluids through a vapor-liquid separator while maintaining the pressure and temperature at the proper levels. To eliminate the emulsions, it is necessary to retain the emulsifying agent in a water-free separator bottoms product. This can be done by proper control of temperature and pressure. By a simple calculation the separator temperature required to eliminate emulsion formation for different operating conditions of pressure, water-oil ratio, and gas-oil ratio can be determined.

While the invention has been described in conjunction with the present preferred embodiments for the prevention of emulsions in an emulsion control system, it should be apparent that the invention is not limited thereto.

That which is claimed is:

1. An apparatus for preventing formation of emulsions comprising, in combination:
   a liquid-vapor separator vessel having an inlet and a first outlet positioned in the upper portion of said liquid-vapor separator vessel and a second outlet positioned within the lower portion of said liquid-vapor separator vessel;
   a pressure controlling means communicating with said first outlet for controlling pressure within said liquid-vapor separator vessel;
   a liquid-liquid phase separator vessel having an inlet, an upper outlet, and a lower outlet, said inlet connected to said second outlet of said liquid-vapor separator vessel;
   an aqueous phase detector means having an inlet and an outlet, said inlet connected to said upper outlet of said liquid-liquid phase separator vessel;
   heating means disposed within said vapor-liquid separator vessel; and
   heat controlling means for operating said heating means, said heat controlling means being responsive to electrical signals transmitted from said pressure controlling means and said aqueous phase detecting means.

2. Apparatus according to claim 1 wherein said pressure controlling means comprises a pressure-actuated switch, said switch transmitting an electrical signal when a preselected pressure has been achieved in said liquid-vapor separator vessel, said electrical signal operating said heat controlling means thereby operating said heating means to produce heat in said liquid-vapor separator vessel, and a back pressure control valve for maintaining a preselected pressure in said liquid-vapor separator vessel.

3. Apparatus according to claim 1 wherein said aqueous phase detector means comprises a BS & W controller, said BS & W controller transmitting an electrical signal when a predetermined amount of water is detected in a product stream by a BS & W monitor, the electrical signal operating said heat controlling means thereby operating said heating means to produce heat in said liquid-vapor separator vessel.

4. Apparatus according to claim 1 wherein said heating means comprises a heater positioned in the lower liquid containing portion of said liquid-vapor separator vessel.

5. Apparatus according to claim 1 wherein said heat controlling means comprises an on and off controller.

6. Apparatus according to claim 1 wherein said heating means comprises a first and a second heater positioned in the lower liquid containing portion of said liquid-vapor separator vessel.

7. Apparatus according to claim 1 wherein said heat controlling means comprises a variable auto transformer responsive to electrical signals from said pressure controlling means, and
   a manually adjustable transformer responsive to on-off electrical signals from said aqueous phase detector means.

8. A process for preventing the formation of an oil-water emulsion comprising:
   introducing recovery products into a liquid-vapor separator vessel;
   heating said products in said liquid-vapor separator vessel thereby flashing overhead light hydrocarbons and water vapors contained in said recovery products;
   drawing off a liquid phase of said recovered products through the lower portion of said liquid-vapor separator vessel;
   passing said liquid phase to a liquid-liquid phase separator vessel;
   withdrawing an oil phase from said liquid-liquid phase separator vessel;
   measuring a pressure representative of the pressure in said liquid-vapor separator vessel and producing a first electrical signal representative thereof;
   measuring the water content in said oil phase withdrawn from said liquid-liquid separator and producing a second electrical signal representative thereof; and
   maintaining the operating temperature in said liquid-vapor separator vessel to prevent the formation of emulsion by operating said heater within said liquid-vapor separator vessel in response to said first and second electrical signals.

9. A process according to claim 8 to include the step of operating a first and a second heater within said liquid-vapor separator vessel in response to said first and second electrical signals.

References Cited
UNITED STATES PATENTS

| | | | |
|---|---|---|---|
| 2,689,875 | 9/1954 | Hachmuth et al. | 208—187 |
| 2,868,701 | 1/1959 | Berger | 196—132 |
| 2,881,118 | 4/1959 | Spann et al. | 196—132 |
| 3,238,111 | 3/1966 | Harper | 196—132 |
| 3,256,902 | 6/1966 | Porter | 208—188 |
| 3,309,308 | 3/1967 | Schad | 208—187 |

DELBERT E. GANTZ, *Primary Examiner.*

G. J. CRASANAKIS, *Assistant Examiner.*

U.S. Cl. X.R.

196—132; 137—2; 210—93, 134, 135, 149